United States Patent [19]

Lebrun et al.

[11] Patent Number: 5,037,933
[45] Date of Patent: Aug. 6, 1991

[54] CONTROLLED POLYMERIZATION OF SILAZANE MONOMERS

[75] Inventors: Jean-Jacques Lebrun, Pierre Benite; Charles Bobichon, Lyon, both of France

[73] Assignee: Rhone-Poulenc Chimie, Courbevoie, France

[21] Appl. No.: 421,944

[22] Filed: Oct. 16, 1989

[30] Foreign Application Priority Data

Oct. 14, 1988 [FR] France .................................. 88 13530

[51] Int. Cl.$^5$ .............................................. C08G 77/06
[52] U.S. Cl. ........................................ 528/23; 528/12; 528/28; 528/34
[58] Field of Search ..................... 528/12, 23, 28, 34

[56] References Cited

U.S. PATENT DOCUMENTS 3,322,722  5/1967  Eynon .................................. 528/23
4,861,844  8/1989  Lebrun et al. ..................... 535/475

Primary Examiner—Melvyn I. Marquis
Attorney, Agent, or Firm—Burns, Doane, Swecker & Mathis

[57] ABSTRACT

Organopolysilazanes or organopoly(disilyl)-silazanes having controlled physicochemical properties, well adapted for shaping and pyrolysis into useful ceramic articles, are prepared by catalytically polymerizing a silazane monomer to a desired degree of polymerization, and then, either during or upon completion of polymerization, contacting the polymerization reaction medium with at least one ion exchange material.

10 Claims, No Drawings

CONTROLLED POLYMERIZATION OF SILAZANE MONOMERS

CROSS-REFERENCE TO COMPANION APPLICATION

Copending application, Ser. No. 421,994 filed concurrently herewith and assigned to the assignee hereof.

BACKGROUND OF THE INVENTION

1. Field of the Invention

The present invention relates to the preparation of organopolysilazanes and/or organopoly(disilyl)silazanes having controlled physicochemical properties, and, more especially, to the preparation of polysilazanes particularly suited for the production of ceramic materials and shaped articles based on silicon nitride and/or silicon carbide, for example fibrous such materials/shaped articles.

2. Description of the Prior Art

Organopolysilazanes and organopoly(disilyl)-silazanes, hereinafter designated "polysilazanes", are well known products existing as monomers, oligomers and cyclic or linear polymers, and also as polymer resins. These polysilazanes may be prepared by a wide variety of processes from a broad range of starting materials.

The polysilazanes may in particular be shaped and pyrolyzed into $Si_3N_4$, SiC or mixtures thereof. They may also be extruded as continuous filaments, the pyrolysis of which yields ceramic fibers.

They may also be in the form of a more or less thin film, or solid molded pieces, and used as a binder of ceramic or carbon fibers and as a sintering binder for porous ceramic shaped articles. The variety of possible forms of the polysilazanes is one of their principal advantages.

To produce good ceramic precursors, the polysilazanes must be converted, after pyrolysis, into ceramic materials in a high yield by weight. It is therefore necessary that the polysilazane have good heat resistance in pyrolysis, which may be provided in particular by a high molecular weight and/or a high viscosity of up to the solid state at ambient temperature.

The monomers or oligomers produced by the conventional ammonolysis of one or more organochlorosilanes are not good precursors, in particular because of their low boiling point temperatures. Pyrolysis thus entails their distillation, at least if it is not carried out under a high pressure, and consequently the ceramic yields are especially low. It will thus be apparent that serious need exists in this art for macromolecular polysilazane backbones having molecular weights sufficiently high to obviate the above problem.

To this end, the catalytic polymerization of silazanes to produce materials having appreciably improved ceramic yields after pyrolysis has already been proposed to this art.

Such polymerization also makes it possible to produce polysilazanes that are solid at ambient temperature and which melt at higher temperatures, thus being potentially extrudable.

However, these polymerization reactions, although they effectively increase the molecular weight of the polysilazanes, have several disadvantages, principally related to the fact that to date it has not been possible to control and deactivate them when the polysilazane, over the course of the polymerization, has attained adequate physicochemical properties for its subsequent conversion.

Therefore, by controlling the degree of polymerization of the polysilazane, it would be possible to control its melting temperature and consequently its forming temperature, which necessarily must be lower than the temperature of onset of degradation of the polymer.

On the other hand, nonnegligible residual amounts of the catalyst may still be present in the formed and recovered polysilazane, such that even following the polymerization stage proper, the polysilazane can continue to increase in molecular weight at ambient temperature and/or during a subsequent treatment and/or working. This is manifested principally by an uncontrollable increase in the melting point of the polymer, which may be very deleterious in industrial production (handling of polymer stocks, control of materials for the conversion thereof).

SUMMARY OF THE INVENTION

Accordingly, a major object of the present invention is the provision of an improved process for the deactivation of the catalytic polymerization of the polysilazanes, thus permitting the control of the physicochemical properties of the final product polysilazanes (such as viscosity, melting point, and the like), in particular to facilitate and control their subsequent conversion.

Briefly, the present invention features an improved process for the polymerization of silazanes in the presence of a catalytically effective amount of a silazane polymerization catalyst, wherein, either during or following the polymerization, the polymerizate is contacted with at least one ion exchange material.

DETAILED DESCRIPTION OF THE PREFERRED EMBODIMENTS OF THE INVENTION

More particularly according to the present invention, it has now unexpectedly been found that the polymerization of polysilazanes can be arbitrarily controlled, both simply, economically and reproducibly to produce polymers having physicochemical properties rigorously adapted to their particular application, in particular to the production of shaped ceramic articles, such as fibers.

The organopolysilazanes polymerized by the process according to the invention are well known compounds and are easily prepared. Representative such silazanes include the products of reaction between (a) at least one organohalogenosilane of the formula (I):

$$R_aX_{4-a}Si \qquad (I)$$

wherein X is a halogen atom, typically chlorine, and the radicals R, which may be identical or different, are each a hydrogen atom, a linear or branched chain, optionally halogenated alkyl radical, a cycloalkyl radical, an aryl radical such as a phenyl or naphthyl radical, an arylalkyl or alkylaryl radical, an alkenyl radical such as a vinyl or allyl radical, or an alkynyl radical such as an ethynyl or propynyl radical, and a is a number equal to 0, 1, 2 or 3, and (b) an organic or organosilyl compound containing an $NH_2$ or NH group, such as, for example, ammonia, a primary or secondary amine, a silylamine, an amide, a hydrazine, a hydrazide, and the like.

As regards the compounds of formula (I), exemplary of the alkyl radicals R are the methyl, ethyl, propyl, butyl, pentyl, hexyl, heptyl and octyl radicals. Representative cycloalkyl radicals R include cyclopentyl, cyclohexyl and cycloheptyl radicals; representative arylalkyl radicals R include the benzyl and phenylethyl radicals; and representative alkylaryl radicals R include the tolyl and xylyl radicals.

Exemplary of the organohalogenosilanes, whether representative:

$CH_3HSiCl_2$, $H_2SiCl_2$, $(CH_3)_2HSiCl$, $HSiCl_3$
$(CH_3)_2SiCl_2$, $(CH_3)_3SiCl$, $CH_3SiCl_3$, $SiCl_4$
$(CH_3)_2Si(CH_2Cl)_2$, $(CH_3)_3SiCH_2Cl$, $CH_3Si(CH_2Cl)_3$
$(C_6H_5)_2SiCl_2$, $(C_6H_5)(CH_3)SiCl_2$, $C_6H_5SiCl_3$
$(CH_3)(CH_3CH_2)SiCl_2$, $(CH_3)(CH_2=CH)SiCl_2$
$(CH_3)_2(CH_2=CH)SiCl$, $(C_6H_5)_2(CH_2=CH)SiCl$
$(C_6H_5)(CH_2=CH)SiCl_2$,
$CH_3(C_6H_5)(CH_2=CH)SiCl$.

Exemplary compounds containing at least one $NH_2$ or NH group and suitable for the synthesis of the above organopolysilazanes are ammonia, methylamine, dimethylamine, ethylamine, cyclopropylamine, hydrazine, methylhydrazine, ethylenediamine, tetramethylenediamine, hexamethylenediamine, aniline, methylaniline, diphenylaniline, toluidine, guanidine, aminoguanidine, urea, hexamethyldisilazane, diphenyltetratetramethyldisilazane, dimethyldiphenyldivinyldisilazane and tetramethyldisilazane.

the polysilazanes obtained upon completion of the reaction more specifically include:

(1) Linear polymers having the following formulae:

$$H_2N(R_2SiNH)_pSiR_2NH_2 \quad (II)$$

and $$R_3SiNH(R_2SiNH)_{p'}SiR_3 \quad (III)$$

wherein R is as defined above for formula (I); and p and p' are integers ranging from 1 to 1,000, generally ranging from 3 to 300.

The polymers of formula (II) may be prepared by contacting diorganodichlorosilanes with ammonia, and those of formula (III) by reacting ammonia with a triorganochlorosilane (see FR 1,086,932 and U.S. Pat. No. 2,564,674).

In general, the reaction of an organohalogenosilane with an organic amine is described in U.S. Pat. Nos. 3,853,567 and 3,892,583 and the reaction of an organohalogenosilane with a disilazane in BE 888,787;

(2) The cyclic polymers having the formula:

$$[R_2SiNH]_n \quad (IV)$$

wherein n ranges from 3 to 10, typically n = 3 or 4 and R is as defined above for formula (I). These are particularly described in GB 881,178;

(3) The resinous polymers comprising recurring units selected from among those of the formulae $R_3SiNH0.5$, $R_2SiNH$, $RSiNH_{1.5}$, $Si(NH)_2$.

These are advantageously prepared by contacting the corresponding organochlorosilanes, or mixture of such silanes, with ammonia, preferably in an organic solvent medium (FR 1,379,243, FR 1,392,853 and FR 1,393,728).

The organopoly(disilyl)silazanes polymerized by the process of the invention are also well known compounds and too are easily prepared. In particular, they may be prepared by reacting (a) an organic or organosilyl compound containing at least one $NH_2$ or NH group, for example ammonia, a primary or secondary amine, an amide, a hydrazine, a hydrazide, and the like, with (b) at least one organohalogenodisilane of the formula:

$$R_bX_{3-b}Si-SiR_cX_{3-c} \quad (V)$$

wherein the radicals R, which may be identical or different, are as defined above, b is equal to 0, 1, 2 or 3, c is equal to 0, 1 or 2, and X is a halogen atom, typically chlorine.

Exemplary of the compounds of Formula (V) are:

$(CH_3)_2ClSiSi(CH_3)_2Cl$, $(CH_3)_2ClSiSiCH_3Cl_2$,
$CH_3Cl_2SiSiCH_3Cl_2$.

Exemplary of the compounds containing at least one NH2 or NH group and suitable for the synthesis of the poly(disilyl)silazanes, the compounds noted above for the aminolysis of the organohalogenomonosilanes are representative.

In general, the halogenodisilane reaction, optionally in the presence of halogenosilane, with ammonia, is described in EP 75,826. The reaction of a halogenodisilane with a disilazane is described in FR 2,497,812.

Finally, as described in EP 75,826, the organopoly(disilyl)silazanes may be prepared by reacting the aforesaid amine derivatives with mixtures of halogenated compounds of formulae (I) and (V).

The initial polysilazanes prepared from ammonia are generally designated ammonolysates and the polysilazanes prepared from an amine compound, as indicated above, are designated aminolysates. The latter thus include the ammonolysates.

Therefore, it is the aminolysates, as described above, which are treated catalytically such as to effect, depending on the nature of the initial aminolysate, polymerization and/or copolymerization and/or molecular rearrangement, in order to improve their pyrolysis behavior.

By the term "polymerization" are intended, in general, the entirety of the conversions noted above, carried out on aminolysates by a catalytic treatment.

Numerous catalysts may be used in the subject process.

One important class of catalysts comprises the acid catalysts, although others are by definition not excluded; they are simply less widely used.

For example, acid earths may be used, as described in Japanese Kokai No. 77/160,446. It is also possible to use the so-called Lewis acids, such as the metal salts of monocarboxylic acids and more particularly the naphthenates or octanoates of iron, zinc, manganese, lead, calcium, zirconium, tin, cobalt or cerium, with the overall conditions of their use being described, for example, in U.S. Pat. No. 3,007,886. The metal salts of inorganic acids may also be used, more particularly the sulfates, nitrates or chlorides of copper, silver, gold, zinc, cadmium, mercury, iron, cobalt or nickel, as described in U.S. Pat. No. 3,187,030.

The invention is also applicable to aminolysates polymerized by means of a strong acid, e.g., perchloric acid, $HClO_4$ and trifluoromethanesulfonic acid, according to the technique described in FR 2,577,933 assigned to the assignee hereof.

Depending on the nature of the initial aminolysates and the catalyst used, it is possible to carry out the polymerization in mass or in solution in a suitable organic solvent.

As indicated above, to date it has not been possible to easily deactivate and thus control a polysilazane polymerization reaction.

Thus, in the particular case in which trifluoromethanesulfonic acid is used as the catalyst, it is surprisingly and unexpectedly observed that the polymerization reaction continues even in the presence of the strong release of ammonia inherent in this type of polymerization, even though it is recognized that the addition of a base to the reaction medium should make it possible to terminate polymerizations of the cationic type (acid catalyst).

Therefore, in order to control these polymerization reactions according to the invention, the reaction medium is contacted with an ion exchange substance.

This contacting is carried out only after the degree of polymerization has advanced to such a state that a silazane polymer has been prepared having the physicochemical properties required for its intended use.

This contacting may be carried out by any known means.

In a first embodiment of the process according to the invention, the contacting may be carried out by directly introducing the ion exchange material into the reaction medium in a finely divided form (powder); the polymer constituting the desired final product is then separated from the mixture by any appropriate means, in particular by filtration.

In another embodiment of the invention, the reaction medium is passed through membranes or screens based on and/or impregnated with ion exchange materials; this technique makes it possible to eliminate the subsequent separation stage.

The contacting parameters in this stage comprise the quantity and quality of the ion exchanger used, the contact time and the temperature, such parameters being interrelated.

The nature of the ion exchange material, i.e., its anionic and/or cationic character, is selected as a function of the nature of the catalyst employed for the polymerization of the aminolysates.

More especially, if a catalyst of the acid type as described above is used, the ion exchange material will be of the anionic type.

A particularly preferred class of ion exchange materials according to the present invention comprises the ion exchange resins.

Ion exchange resins are essentially synthetic polymers well known to this art. Compare, for example, the article in *Techniques de L'Inoenieur*, ref. J 2860 a, and entitled: "Chemical Unit Operations: Ion Exchange."

In a polymerization carried out using a catalyst of the acid type, the preferred anion exchange resins according to this invention are the polystyrene and the polyacrylic resins.

Preferably, resins of the polystyrene type are used.

The anionic resins of polystyrene type most suitable for the process according to the invention correspond to the following formula:

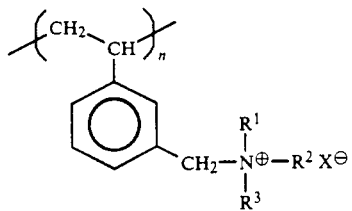

wherein X is a halogen atom, typically chlorine, and the radicals $R^1$, $R^2$ and $R^3$, which may be identical or different, are each a hydrogen atom or an optionally substituted hydrocarbon radical. The most representative hydrocarbon radicals include linear or branched chain, optionally halogenated alkyl radicals, cycloalkyl radicals, aryl radicals such as the phenyl and naphthyl radicals, arylalkyl or alkylaryl radicals, alkenyl radicals, such as the vinyl or allyl radicals and alkynyl radicals, such as the ethynyl or propynyl radicals.

Exemplary alkyl radicals R are the methyl, ethyl, propyl, butyl, pentyl, hexyl, heptyl and octyl radicals. Exemplary cycloalkyl radicals R are the cyclopentyl, cyclohexyl and cycloheptyl radicals. Exemplary arylalkyl radicals R are benzyl and phenylethyl; and exemplary alkylaryl radicals R are tolyl and xylyl.

The radicals $R^1$, $R^2$ and $R^3$ of alkyl type are especially preferred.

The resin is preferably used in the form of a powder and is directly introduced into the reaction medium.

Small amounts of the resin are sufficient; generally, such amounts range from 0.1 to 10% by weight, preferably from 0.1 to 4% by weight relative to the total weight of the reaction medium.

The contact time may range from several minutes to one or two hours.

At the completion of this stage, the polymerized polysilazane is separated, possibly in solution in a solvent, by any known means, in particular by filtration.

The polysilazane recovered in this manner, optionally after eliminating the solvent by drying, constitutes the production and desired final product.

These polysilazanes find a particularly useful application in the production of ceramic materials and shaped articles comprising, at least in part, silicon nitride and/or carbide.

In the most general case (production of a powder), the polysilazane is then heated in an inert atmosphere or a vacuum at a temperature of from 600° to 1,500° C., until the polysilazane is converted entirely into $Si_3N_4$ and/or SiC.

In light of their rigorously controlled physicochemical properties, the polysilazanes prepared by the process according to the invention are especially well suited for the production of ceramic shaped articles, such as fibers. The polysilazane is thus extruded in the form of fibers using an extrusion die and then heat treated (pyrolysis) to yield a fiber based on Si3N4 and/or SiC. The fibers may then be used as reinforcing structures in composite materials, in particular of the ceramic/ceramic, ceramic/plastic or metal/ceramic type.

In order to further illustrate the present invention and the advantages thereof, the following specific examples are given, it being understood that same are intended only as illustrative and in nowise limitative.

EXAMPLES 1 to 3

These examples illustrate the thermal stability of the polysilazanes prepared according to a process of the invention.

(A) Preparation of the initial coammonolysates:

Into a three liter, double-walled reactor, equipped with mechanical agitation means, a gas inlet tube and a condenser, coammonolysis was carried out, in the presence of 1.1 liter isopropyl ether, of a mixture of $(CH_3)_2SiCl_2$ (form D) and $CH_3SiCl_3$ (form T) in variable proportions. The D/T mixture in isopropyl ether was cooled to 3° C. and was maintained at this temperature during the introduction of gaseous $NH_3$. The rate of introduction of $NH_3$ was maintained at about 6 ml/s of the gas and the addition was carried out over 6 hours. Over the course of the reaction, substantial amounts of ammonium chlorhydrate were formed, which thickened the solution.

Upon completion of the reaction, the $NH_4Cl$ formed was filtered on sintered glass (average pore diameter: 10 $\mu$m). The precipitate was washed several times with a dry solvent. The solution recovered was clear. The solvents were evaporated in vacuum (25 mbar at 70° C.) and the last trace amounts of solvent were eliminated at 70° C. under a vacuum of 2 mbar.

The coammonolysates obtained were viscous liquids at ambient temperature.

The amounts of the chlorosilanes introduced at the onset of the reaction were the following:

(i) 53.6 g $(CH_3)_2SiCl_2$ (0.36 mole) and 138.7 g $CH_3SiCl_3$ (1.06 mole, a T/D ratio of 75/25;

(ii) 78.7 g $(CH_3)_2SiCl_2$ (0.67 mole and 119.1 g $CH_3SiCl_3$ (0.91 mole), a molar ratio of T/D = 60/40;

(iii) 72.1 g $(CH_3)_2SiCl_2$ (0.61 mole) and 134.0 g $CH_3SiCl_3$ (1.3 mole), a molar ratio T/D of 55/45.

(B) Polymerization of the coammonolysates:

The coammonolysates produced under (A) were diluted to 50% by weight in isopropyl ether. The polymerization catalyst used was trifluoromethanesulfonic acid. The temperature was 70° C.

After polymerization, 3.0% of the resin "Microne" marketed by Rohm & Hass (anionic resin of the polystyrene type) was added over 30 minutes at ambient temperature. The reaction medium was then filtered on No. 4 frit. The solvent was eliminated under 2 mm Hg at 170° C. over 3 hours. The melting points Pf of the polymers produced were the following:

| EXAMPLES | COAMMONOLYSATE T/D | Pf (°C.) |
|---|---|---|
| 1 | 55/45 | <30 |
| 2 | 60/40 | 85 |
| 3 | 75/25 | 145 |

The polymers thus produced were thermally stable when heated to 170° C. for 4 hours.

COMPARATIVE EXAMPLES 4 to 6

These comparative examples were carried out by repeating the procedure of Examples 1 to 3, but without contacting the reaction medium with the anionic resin. The melting points Pf of the polymers produced were the following:

| EXAMPLES | COAMMONOLYSATE T/D | Pf (°C.) |
|---|---|---|
| 4 | 55/45 | 130 |
| 5 | 60/40 | 180 |
| 6 | 75/25 | <240 |

The polymer of Example 4, heated to 170° C., had its melting point increase 30° C. over 4 hours, and the polymer of Example 5, heated to 170° C., had its melting point increase 40° C. over 4 hours.

The above results evidence that silazane polymers can be prepared having a softening point and, thus, necessarily a working temperature, such that extrusion (if fibers are to be produced) can be carried out below the critical temperature of the onset of degradation, which typically is about 200° C. for such polymers. Also, such polymers can be worked at lower temperatures, thereby saving energy and material. Moreover, flexibility and safety are improved during the stages of working of the polymer.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an organopolysilazane or organopoly(disilyl)silazane having controlled physicochemical properties, comprising catalytically polymerizing a silazane monomer to a desired degree of polymerization, and then, either during or upon completion of said polymerization, contacting the polymerization reaction medium with at least one ion exchange material to control the polymerization reaction.

2. The process as defined by claim 1, said ion exchange material comprising an ion exchange resin.

3. The process as defined by claim 1, said catalytic polymerization being carried out in mass.

4. The process as defined by claim 1, said catalytic polymerization being carried out in solution in an organic solvent.

5. The process as defined by claim 1, said catalytic polymerization being carried out in the presence of an acid polymerization catalyst.

6. The process as defined by claim 5, said acid catalyst comprising perchloric acid or trifluoromethanesulfonic acid.

7. The process as defined by claim 2, said ion exchange resin comprising a polystyrene or polyacrylic anion exchange resin.

8. The process as defined by claim 7, said ion exchange resin having the following formula:

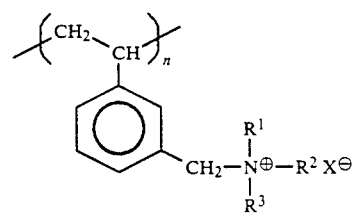

wherein X is a halogen atom and $R^1$, $R^2$ and $R^3$, which may be identical or different, are each a hydrogen atom or an optionally substituted hydrocarbon radical.

9. The process as defined by claim 8, wherein each of $R^1$, $R^2$ and $R^3$ is an alkyl radical.

10. The polysilazane product of the process as defined by claim 1.

* * * * *